H. I. HAWXHURST.
CARBURETER.
APPLICATION FILED OCT. 2, 1916.
1,362,305.
Patented Dec. 14, 1920.
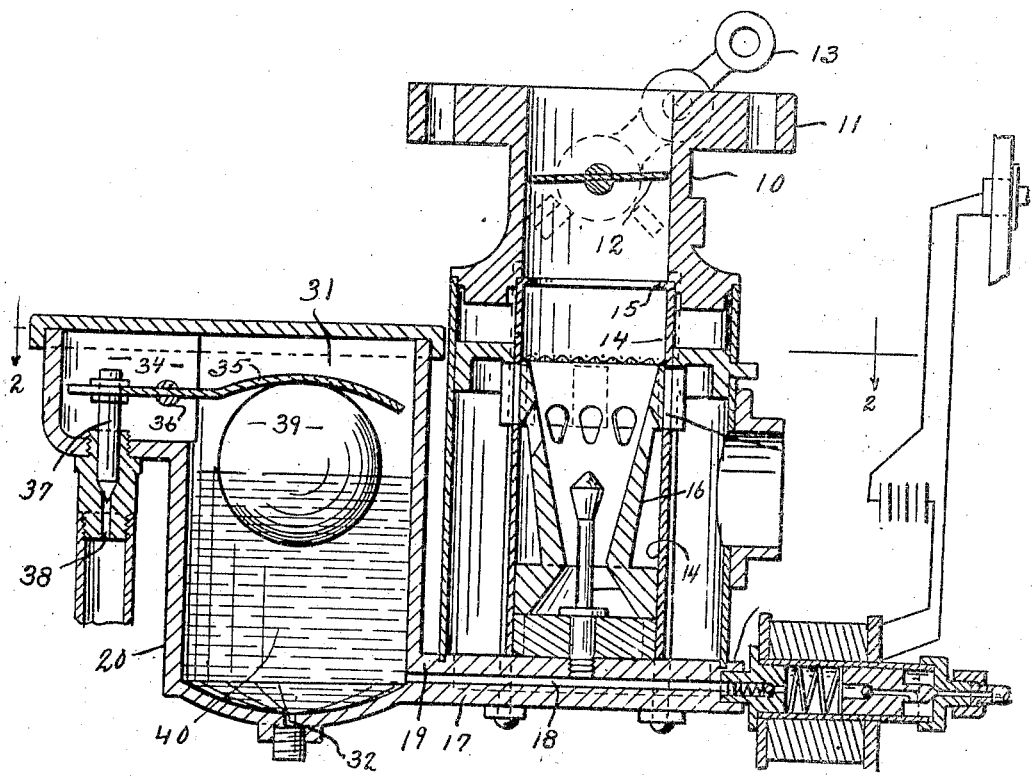
INVENTOR
H. I. HAWXHURST.
ATTORNEY

UNITED STATES PATENT OFFICE.

HENRY I. HAWXHURST, OF SIERRA MADRE, CALIFORNIA.

CARBURETER.

1,362,305.

Specification of Letters Patent.

Patented Dec. 14, 1920.

Application filed October 2, 1916. Serial No. 123,228.

*To all whom it may concern:*

Be it known that I, HENRY I. HAWXHURST, a citizen of the United States, residing at Sierra Madre, in the county of Los Angeles, State of California, have invented new and useful Improvements in Carbureters, of which the following is a specification.

My invention primarily relates to a carbureter for use on explosion engines in propelling vehicles. It may, however, be used on stationary explosive engines.

The object of my invention is to produce a float operated valve for a carbureter in which the valve which controls the admission of fuel into the float chamber is regulated by a hollow celluloid ball; and the object thereof is to operate the valve by means of a ball that expands and diminishes in size as the temperature rises and falls whereby the fuel supply is opened and cut off sooner or later than would be the case if a ball were used whose size was not influenced by the temperature of the fuel.

A further object is to operate the inlet valve of the float chamber by means that will not be objectionably affected by the vibration of the engine when the vehicle passes over an obstruction or into a depression and which will respond to barometric and thermal conditions.

The drawings forming a part of this application is a central vertical section of my improved carbureter.

Referring to the drawings 10 is a cylindrical casing having a flange 11 at its upper end, by means of which it is secured to the intake manifold. In this casing is mounted the usual butterfly valve 12 which is provided with handle or lever 13, controlled in the usual well known manner. Projecting from the lower end of casing 10 is the mixing pipe 14 having an inturned flange 15 at its upper end to stop the upward movement of Venturi tube 16. The lower end of the mixing pipe rests upon the casing 17 of the inlet duct 18 which forms a part of ledge 19 that projects from the bottom of casing 20.

The main portion of casing 20 is cylindrical and forms the float chamber 31. It has a port 32 in the bottom thereof closed by plug 33 which can be removed when it is desired to empty the float chamber. At some point in its upper portion casing 20 is expanded outward to form what I term a valve chamber 34. This is preferably at the point farthest from the mixing pipe. A lever 35 is pivotally mounted in the side walls of the valve chamber by bolt 36. Lever 35 carries a needle valve 37 which controls port 38 in the bottom of the valve chamber. A hollow celluloid ball 39 rests on the liquid fuel 40 in chamber 31 and when the liquid rises to a predetermined height it engages lever 35 and operates valve 37 to cut off the flow of fuel into the float chamber. By the use of a detached hollow celluloid ball in the float chamber of less diameter than the diameter of the chamber and by placing the float chamber in such relation to the mixing pipe that it will be directly before it when the machine is climbing a hill. I accomplish several important results. By the use of a hollow celluloid ball when the air is cold in the morning the ball contracts and a greater supply of fuel is admitted into the float chamber than when the air is warm. When the air is warm the ball expands and shuts off the supply of fuel into the float chambers sooner than when the air is cold. When a metal float is used to control the valve lever of the valve which controls the flow of fuel to the float chamber and the vehicle goes over an obstruction or into a depression the inertia of the metal float on the downward thrust carries the float below the desired level and allows an excess of fuel to flow into the chamber, thereby raising the level above the normal operating level and causing an excess of liquid passing out of the spray jet thus wasting fuel. By using a hollow celluloid ball to control such valve lever the vibration does not affect the inlet valve as the ball is too light to dip down into the liquid and no change of liquid level in the float chamber takes place by reason of such vibration. While I have illustrated the float as a round ball it is obvious that the shape may be varied without departing from the spirit of my invention.

Having described my invention, what I claim is:

1. In a carbureter, a float chamber having a fuel admission port; a valve to control said port, a lever to control said valve; and a hollow celluloid float to operate said lever; whereby the supply of liquid is cut off when it rises to a predetermined level.

2. In a carbureter, a float chamber having a fuel admission port, a valve to control said port; a lever to control said valve; and a detached hollow celluloid ball float in said chamber, adapted to operate said lever to cut off the supply of liquid when it rises to a predetermined height.

In witness that I claim the foregoing I have hereunto subscribed my name this 19th day of September, 1916.

H. I. HAWXHURST.